US011972327B2

(12) United States Patent
Srinivasan et al.

(10) Patent No.: US 11,972,327 B2
(45) Date of Patent: Apr. 30, 2024

(54) METHOD FOR AUTOMATING ACTIONS FOR AN ELECTRONIC DEVICE

(71) Applicant: Samsung Electronics Co., Ltd., Suwon-si (KR)

(72) Inventors: Vijay Srinivasan, San Jose, CA (US); Christian Koehler, Sunnyvale, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 994 days.

(21) Appl. No.: 15/967,327

(22) Filed: Apr. 30, 2018

(65) Prior Publication Data
US 2019/0065993 A1 Feb. 28, 2019

Related U.S. Application Data

(60) Provisional application No. 62/550,139, filed on Aug. 25, 2017.

(51) Int. Cl.
  G06N 20/00 (2019.01)
  G06N 7/01 (2023.01)
(52) U.S. Cl.
  CPC .............. *G06N 20/00* (2019.01); *G06N 7/01* (2023.01)
(58) Field of Classification Search
  CPC .............................. G06N 7/005; G06N 20/00
  See application file for complete search history.

(56) References Cited

U.S. PATENT DOCUMENTS

| 9,400,995 | B2 | 7/2016 | Gu et al. |
| 10,841,122 | B1* | 11/2020 | Jensen ................ H04L 12/2816 |
| 2011/0057790 | A1 | 3/2011 | Martin et al. |
| 2012/0246684 | A1 | 9/2012 | Yarvis et al. |
| 2013/0085977 | A1 | 4/2013 | Junker |
| 2013/0117367 | A1 | 5/2013 | Murakami et al. |
| 2014/0052680 | A1 | 2/2014 | Nitz et al. |
| 2015/0237470 | A1 | 8/2015 | Mayor et al. |

(Continued)

FOREIGN PATENT DOCUMENTS

| CN | 103473262 A | 12/2013 |
| CN | 103827853 A | 5/2014 |

(Continued)

OTHER PUBLICATIONS

Sebastian Lühr, Geoff West, & Svetha Venkatesh (2007). Recognition of emergent human behaviour in a smart home: A data mining approach. Pervasive and Mobile Computing, 3(2), 95-116. (Year: 2007).*

(Continued)

*Primary Examiner* — Kakali Chaki
*Assistant Examiner* — Johnathan R Germick
(74) *Attorney, Agent, or Firm* — Sherman IP LLP; Kenneth L. Sherman; Steven Laut

(57) ABSTRACT

A method for action automation includes determining, using an electronic device, an action based on domain information. Activity patterns associated with the action are retrieved. For each activity pattern, a candidate action rule is determined. Each candidate action rule specifies one or more preconditions when the action occurs. One or more preferred candidate action rules are determined from multiple candidate action rules for automation of the action.

20 Claims, 13 Drawing Sheets

(56) References Cited

U.S. PATENT DOCUMENTS

| | | |
|---|---|---|
| 2015/0373132 A1 | 12/2015 | Mukherji et al. |
| 2016/0162976 A1 | 6/2016 | Koukoumidis et al. |
| 2017/0140041 A1 | 5/2017 | Dotan-Cohen et al. |

FOREIGN PATENT DOCUMENTS

| | | |
|---|---|---|
| CN | 105981418 A | 9/2016 |
| KR | 10-2016-0064234 A | 6/2016 |
| WO | 2013-088682 | 6/2012 |

OTHER PUBLICATIONS

Valiente-Rocha P.A., Lozano-Tello A. (2010) Ontology and SWRL-Based Learning Model for Home Automation Controlling. In: Augusto J.C., Corchado J.M., Novais P., Analide C. (eds) Ambient Intelligence and Future Trends—International Symposium on Ambient Intelligence (ISAmI 2010). (Year: 2010).*
(continued) Advances in Soft Computing, vol. 72. Springer, Berlin, Heidelberg. https://doi.org/10.1007/978-3-642-13268-1_10 (Year: 2010).*
Chandrakana Nandi, & Michael D. Ernst (2016). Automatic trigger generation for rule-based smart homes. In PLAS 2016: ACM SIGPLAN Workshop on Programming Languages and Analysis for Security (pp. 97-102). (Year: 2016).*
E. Hoque and J. Stankovic, "AALO: Activity recognition in smart homes using Active Learning in the presence of Overlapped activities," 2012 6th International Conference on Pervasive Computing Technologies for Healthcare (PervasiveHealth) and Workshops, 2012, pp. 139-146 (Year: 2012).*
M. A. U. Alam, N. Roy, A. Misra and J. Taylor, "CACE: Exploiting Behavioral Interactions for Improved Activity Recognition in Multi-inhabitant Smart Homes," 2016 IEEE 36th International Conference on Distributed Computing Systems (ICDCS), 2016, pp. 539-548 (Year: 2016).*
Ur, B., McManus, E., Pak Yong Ho, M., & Littman, M. (2014). Practical Trigger-Action Programming in the Smart Home. In Proceedings of the SIGCHI Conference on Human Factors in Computing Systems (pp. 803-812). Association for Computing Machinery. (Year: 2014).*
K. Eckert, T. Frank, T. Hadlich, A. Fay, B. Vogel-Heuser and C. Diedrich, "Typical automation functions and their distribution in automation systems," ETFA2011, Toulouse, France, 2011, pp. 1-8, doi: 10.1109/ETFA.2011.6059123. (Year: 2011).*
Xin et al., "Extracting Redundancy-Aware Top-K Patterns," KDD, Aug. 2006, pp. 444-453, ACM Press, United States.
Serrano, D., et al., "Condensed Representation of Frequent Itemsets," International Database Engineering and Applications, Jul. 2014, pp. 168-175, ACM, United States.
Han, J., et al., "FreeSpan: frequent pattern-projected sequential pattern mining," In ACM SIGKDD international conference on Knowledge discovery and data mining, Aug. 2000, pp. 355-359, ACM, United States.
Srinivasan, V., et al., "MobileMiner: Mining Your Frequent Patterns on Your Phone," In ACM International Joint Conference on Pervasive and Ubiquitous Computing, Sep. 2014, pp. 389-400, ACM, United States.
Liu, G., et al., "A Flexible Approach to Finding Representative Pattern Sets," Journal IEEE Transactions On Knowledge And Data Engineering, Jul. 2014, pp. 1562-1574, vol. 26, No. 7, IEEE, United States.
Jin, R., et al., "Effective and Efficient Itemset Pattern Summarization: Regression-based Approaches, " In Proceedings of KDD, Aug. 2008, pp. 399-407, ACM Press, United States.
Yang, G., et al., A Personalized Association Rule Ranking Method Based on Semantic Similarity And Evolutionary Computation, In Evolutionary Computation, Jun. 2008, pp. 487-494, IEEE, United States {Abstract Only}.
International Search Report and Written Opinion dated Nov. 30, 2018 for International Application PCT/KR2018009831 from Korean Intellectual Property Office, pp. 1-9, Republic of Korea.
Mukherji, A. et al., "Adding intelligence to your mobile device via on-device sequential pattern mining." In Proceedings of the 2014 ACM International Joint Conference on Pervasive and Ubiquitous Computing: Adjunct Publication, Sep. 13, 2014, pp. 1005-1014, ACM Digital Library.
Sarker, I. et al., "Evidence-based behavioral model for calendar schedules of individual mobile phone users." In 2016 IEEE International Conference on Data Science and Advanced Analytics (DSAA), pp. 584-593, Oct. 17, 2016, IEEE, United States.
Mehrotra, A. et al., "PrefMiner: mining user's preferences for intelligent mobile notification management." In Proceedings of the 2016 ACM International Joint Conference on Pervasive and Ubiquitous Computing, Sep. 12, 2016, pp. 1223-1234, ACM Digital Library.
Extended European Search Report dated May 13, 2020 for European Application No. 18848825.8 from European Patent Office, pp. 1-9 Munich, Germany.
Chinese Office Action dated Mar. 30, 2023 for Chinese Patent Application No. 201880045632.6, from China National Intellectual Property Administration, pp. 1-11, Beijing, China [Includes English-language translation].
Chinese Office Action dated Oct. 18, 2023 for Chinese Patent Application No. 201880045632.6, from China National Intellectual Property Administration, pp. 1-11, China {Machine-language translation}.

* cited by examiner

600

| % of users | # of common actions | # of common candidate rules | # of common rules suggested by RuleMiner |
|---|---|---|---|
| >=1 user | | | |
| >=10% | 20 | 518 | 59 |
| >=20% | 11 | 140 | 27 |
| >=30% | 8 | 61 | 15 |
| >=40% | 7 | 34 | 9 |
| >=50% | 6 | 18 | 4 |
| >=60% | 4 | 7 | 0 |
| >=70% | | 0 | 0 |

FIG. 6

| Target action | Summarized rules |
|---|---|
| Watch Movie | TVON afternoon hour=15 |
| | TVON morning weekend |
| | TVON hour=5 pre-morning |
| | TVON night weekend |
| Watch newscast | Tuesday morning weekday |
| | TVON afternoon weekend |
| | TVON hour=1 late-night |
| | TVON Wednesday morning weekday |
| Watch Channel 173 | Saturday morning weekend |
| | Thursday morning weekday |
| | TVON afternoon Thursday weekday |
| Watch dramatic movie | Saturday morning weekend |
| | Saturday night weekend |
| | TVON afternoon Thursday weekday |

FIG. 10

| Input Contextual Interval | Relevant Actions |
|---|---|
| evening Monday TVON | Watch Newscast |
| | Watch movie |
| | Watch channel 5 |
| hour=2 weekend TVON late-night | Watch entertainment fiction |
| hour=9 weekend TVON morning | Watch entertainment show |
| | Watch society show |
| | Watch channel 3 |
| | Watch channel 4 |

FIG. 11

METHOD FOR AUTOMATING ACTIONS FOR AN ELECTRONIC DEVICE

CROSS REFERENCE TO RELATED APPLICATIONS

This application claims priority from U.S. Provisional Patent Application Ser. No. 62/550,139, filed on Aug. 25, 2017, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to smart device automation and, in particular, to determining personalized action automation.

BACKGROUND

Modern smartphones and ubiquitous computing systems collect a wealth of context data from users. Conditional action rules, as popularized by the IFTTT (If-This-Then-That) platform, are a popular way for users to automate frequently repeated tasks or receive smart reminders, due to the intelligibility and control that rules provide to users. A key drawback of IFTTT systems is that they place the burden of manually specifying action rules on the user.

SUMMARY

One or more embodiments generally relate to determining preferred rules for action automation. In one embodiment, a method includes determining, using an electronic device, an action based on domain information. Activity patterns associated with the action are retrieved. For each activity pattern, a candidate action rule is determined. Each candidate action rule specifies one or more pre-conditions when the action occurs. One or more preferred candidate action rules are determined from multiple candidate action rules for automation of the action.

In another embodiment, an electronic device includes a memory storing instructions. At least one processor executes the instructions including a process configured to: determine an action based on domain information, retrieve a plurality of activity patterns associated with the action, for each activity pattern, extract a candidate action rule, wherein each candidate action rule specifies one or more pre-conditions when the action occurs, and determine one or more preferred candidate action rules from a plurality of candidate action rules for automation of the action.

In one embodiment a non-transitory processor-readable medium that includes a program that when executed by a processor performing a method that includes determining, using an electronic device, an action based on domain information. A plurality of activity patterns associated with the action are retrieved. For each activity pattern, a candidate action rule is extracted. Each candidate action rule specifies one or more pre-conditions when the action occurs. One or more preferred candidate action rules are determined from a plurality of candidate action rules for automation of the action.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 6 shows a table of example common rules across a population, according to some embodiments;

FIG. 10 shows an example table of smart television (TV) rules for an exemplary user, according to some embodiments;

FIG. 11 shows an example table of context-driven rules for an exemplary user, according to some embodiments;

DETAILED DESCRIPTION

Figure 1:
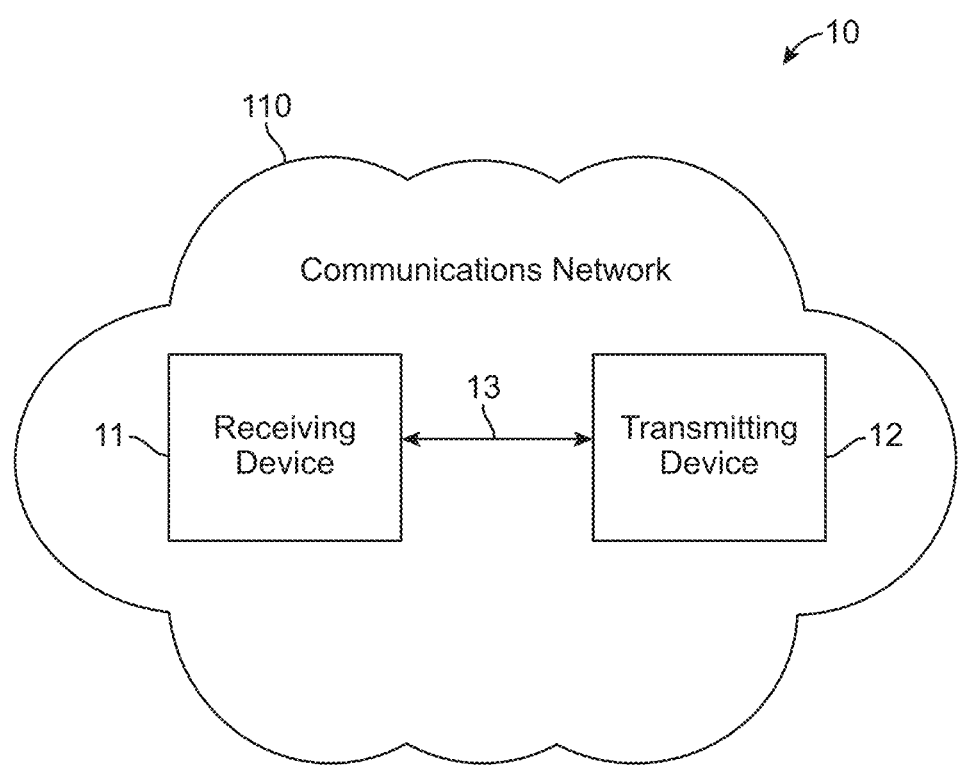
FIG. 1 shows a schematic view of a communications system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for determining preferred rules for action automation. Some embodiments include a method that includes determining, using an electronic device, an action based on domain information. Activity patterns associated with the action are retrieved. For each activity pattern, a candidate action rule is determined. Each candidate action rule specifies one or more pre-conditions when the action occurs. One or more preferred candidate action rules are determined from multiple candidate action rules for automation of the action.

In some embodiments, the problem of how to present a small subset of rules to smartphone users and allow them to interactively select action rules is approached by designing and implementing rule selector processing, which is an interactive rule selection tool that provides for smartphone (or similarly functional smart device) users to browse, modify, and select action rules from a small set of summarized rules presented to users.

In some embodiments, the rule selector processing automatically suggests rules and provides for users to select and modify the suggested rules. Modern ubiquitous computing systems such as smartphones, wearable devices, and smart TVs collect a wealth of context information from users. For example, smartphones collect user contexts such as daily activities of users (dining, commuting, exercising, etc.), device activity such as apps used, app actions performed, short message service (SMS) and call logs, and semantic locations of the user at various granularities such as home, work, cafes, cubicle, or living room. Context data may enrich the user experience in a number of ways, such as presenting users with the most relevant apps given the current context, recommending events or content based on user context, or even improving the capabilities of voice assistants by leveraging the current context. Context recognition may also enrich user experience by allowing users to specify context-aware conditional action rules. In general, a conditional action rule is of the form: 'If certain contextual pre-conditions are satisfied, perform some device action'. Commercially, conditional action rules have been realized by IFTTT (If-This-Then-That), which is a free platform that allows users to specify and execute conditional action rules across popular cell phone platforms, and in diverse domains such as smart home automation, smartphone action automation and reminders, and even task automation for your car. IFTTT rules allow users to explicitly automate frequently repeated tasks or receive intelligent reminders and notifications at the right contexts.

A natural approach for automating device actions or showing reminders is to formulate the problem as a user action prediction problem. For example, if the user is predicted to set the volume to mute with high confidence, then mute the smartphone or remind the user to do so. A key reason for the popularity of IFTTT rules among a segment of the user population is that they provide more control and transparency to the end user on the situations under which action automation or reminders happen, allowing them to add and remove rules as desired. However, IFTTT relies completely on end users to specify the rules that they would like to automatically execute; this places a high burden on users to carefully specify their own rules based on their memory of personal action patterns. Alternatively, having a common population library of typical action rules is not always useful, since the vast majority of action rules discovered for each individual are highly personalized. It should be noted that even for the common actions shared across multiple rules, the proportion of unique rules for these common actions that are shared across the sample users is quite low. In one experiment, there shows 714 unique rules for actions commonly shared among the users, but only 59 of those unique rules are also shared by all the users. Therefore, the vast majority of rules recommended should be personalized rules applicable to a specific user; this strongly motivates the need for personalized and interactive rule selection interface. In some embodiments, the rule selector processing solves the conventional problems by automatically mining and presenting a small set of summarized action rules to users, and enabling the users to select action rules interactively through rule selection interfaces.

In some embodiments, rule selector processing provides a complete end-to-end interface for conditional action rule selection that: (i) collects contextual data associated with users, (ii) mines and selects a small number of candidate conditional action rules to maximize rule significance and mitigate rule redundancy, and (iii) provides processing to allow end users to browse, modify, and select the mined conditional action rules that they would like to automate in their daily lives. For example, rule selector processing may provide a smart reminder for charging a smartphone while the user is in a cubicle, while further rule selector processing may provide another rule that automates a music playlist on the smartphone based on the user's behavior patterns. Some embodiments provide selection of co-occurrence conditional action rules.

In some embodiments, rule selector processing provides smartphone users the ability to create personalized conditional action rules leveraging the candidate rules discovered by pattern mining on mobile context data. To reduce the large number of candidate rules generated from user behavior patterns, rule selector processing is implemented for selecting the top conditional action rules based on four rule selection metrics that are easily explainable to smartphone users: one rule redundancy metric (total action coverage), and three rule significance metrics (confidence, interval count, and contextual specificity).

In some embodiments, the rule selector processing provides interactive rule exploration and selection that provides smartphone users to browse diverse sets of mined conditional action rules based on tuning rule selection metrics, selection of rules of interest, and modification of rules if necessary before deciding to include the rules in their daily lives. The rule selector processing may be applied to public context datasets from smart homes, TV viewership, and digital health monitoring for automation in these domains.

In some embodiments, each action rule that is recommended is of the following form: (Pre-condition→Action), where the pre-condition may be any combination of the following pattern types: co-occurrence: when A, B, and C occur together, perform action D (e.g., when it is Saturday morning, sunny, and the temperature >20° C., remind me to go for a run); sequence: after A, B, and C are performed in sequence, perform action D (e.g., after I turn off the bedroom lights, set my phone to vibrate, connect my smartphone to the charger, and play the 'Sleep' playlist on my phone);

periodic and temporal: N minutes after I last performed action A, B, and C, perform action B (e.g., two hours after I arrive at the office, remind me to order food from a food delivery service).

In some embodiments, thousands of candidate conditional action rules may be summarized to a small set of 4-5 conditional action rules per action based on simultaneously optimizing four rule metrics.

1): Average Rule Confidence: for each action rule, rule confidence is defined as the likelihood that the user will perform the target action when the pre-condition is satisfied. In other words, rule confidence is the conditional probability P(Action|Pre-condition). It is preferred to recommend rules where the rule confidence is high, i.e. the user is more likely to perform the target action being automated. For example, the rule {Commuting to Home}→Play Music App Bollywood Playlist, is a poor choice for rule automation if the user plays the Bollywood playlist only 50% of the time that she is commuting to home. However, the rule {Commuting to Home}→Play My preferred news headlines, is a better choice for rule automation if the user plays their preferred news 95% of the time that she is commuting to home.

2): Average Rule Specificity: for each action rule, rule specificity is defined as how specific the pre-conditions in the action rule is. It is desired to select rules that have high specificity and be as specific as possible to improve the effectiveness of the timing of the automated action. In other words, rule specificity is the inverse of the prior probability (1-P(Pre-condition)). For example, a Pre-Condition of {'At Home'} is not very specific and has low specificity since it occurs very often and has a high prior probability (and low inverse prior). On the other hand, a pre-condition of {'At Kitchen', 'Cooking Breakfast'} has high specificity since it occurs only at most once per day in the morning. In other words, the inverse prior probability of {'At Kitchen', 'Cooking Breakfast'} is quite high.

3): Total Action Coverage: for the set of conditional action rules that we recommend, total action coverage is the percentage of distinct target user actions that the set of rules cover. For example, if two rules for battery charging reminder actions are recommended: {In Office, Battery Level<50%} and {In Office, Between 10-11 AM} would be a poor choice since it covers only 50% of the user charging actions. However, if the following two rules for battery charging reminder actions are recommended: {In Office, Battery Level<50%} and {In Home, Battery Level<25%}, this is a much better choice since it covers 95% of the user charging actions.

4): Number of Rules: it is desired to minimize the number of rules that are recommended to the user while maximizing the above three metrics. It is desired to recommend as few rules as possible to the end user to maximize user convenience in terms of action automation and minimize user interruptions while suggesting and enabling rules.

In some embodiments, maximizing the total action coverage while minimizing the number of rules generated is important to ensure that the utility of action automation is maximized to the end user through conditional action rules, while minimizing the user annoyance from excessive rule suggestions. The rule selector processing recommends a small set of conditional action rules to the end user to automate any target action, while optimizing on the following four metrics: maximizing action coverage; minimizing the number of rules, in order to minimize user annoyance from excessive rule suggestions; maximizing rule confidence; and maximizing rule specificity. Distinguishable from conventional rule summarization is that all of the conventional works focus on maximizing individual rule significance metrics and/or on the total number of patterns covered by the summarized rules (pattern coverage). None of the existing works focus on maximizing the total number of user target actions covered by the summarized rules generated (total action coverage). One advantage of the embodiments is that the total actions covered by the summarized rules are maximized, which ensures that the conditional action rules generated significantly improve the convenience of the end user in automating actions, compared to conventional works which focus on maximizing pattern coverage.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to smartphones, mobile telephone devices, television systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, data and control information, voice communications (e.g., telephone calls), data communications (e.g., e-mails, text messages, media messages), video communication, or combinations of these (e.g., video conferences).

Figure 2:
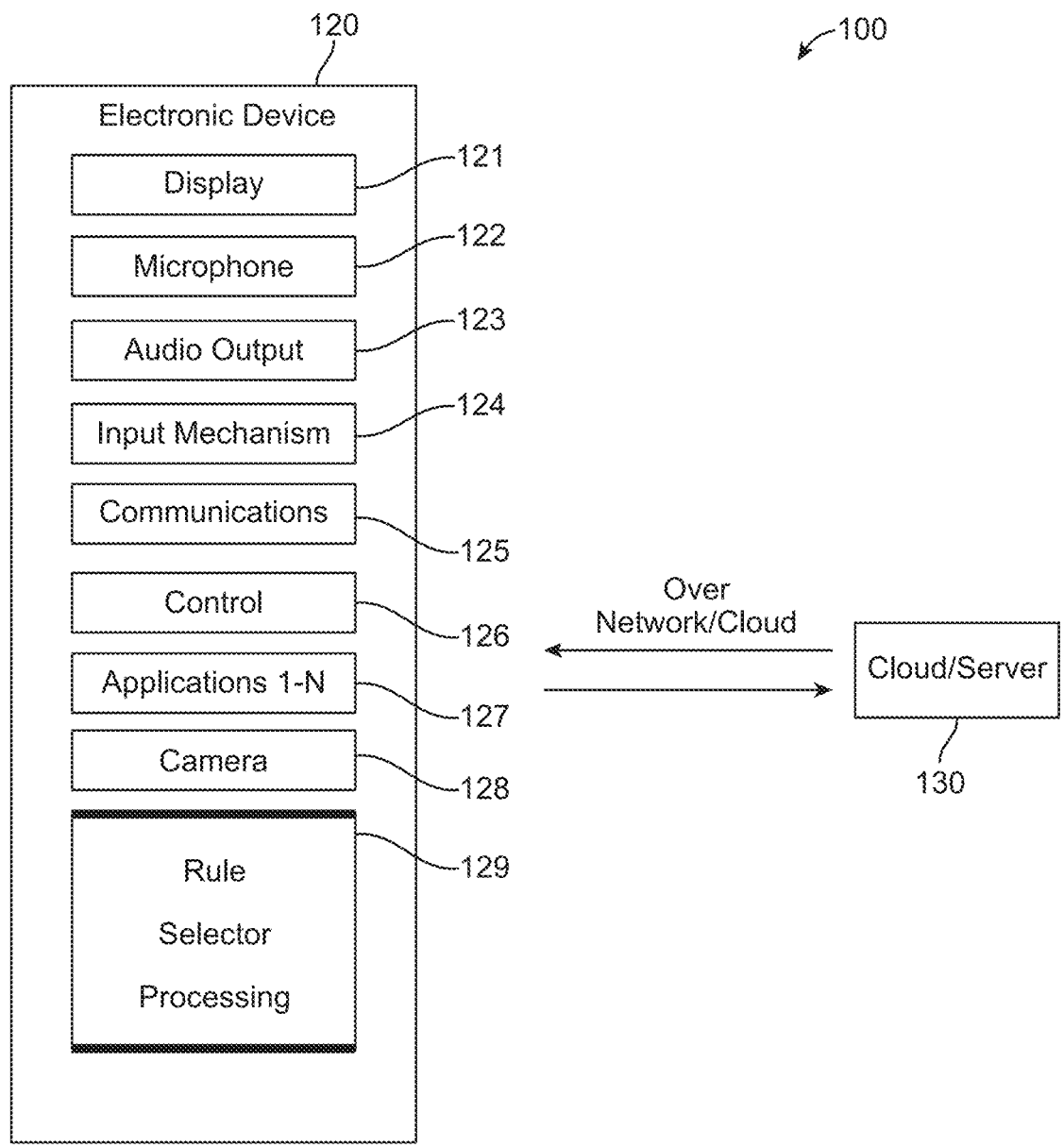
FIG. 2 shows a block diagram of architecture for a system including an electronic device including a rule selector processing app, according to some embodiments.

FIG. 2 shows a functional block diagram of an architecture system 100 that may be used for determining personalized preferred rules for action automation using an electronic device 120 (e.g., smartphones, mobile telephone devices, television (TV) systems, cameras, camcorders, a device with audio video capabilities, tablets, pad devices, wearable devices, smart appliances, smart picture frames, smart lighting, etc.). Both the transmitting device 12 (FIG. 1) and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera 128, a rule selector processing app 129 (for performing rule selector processing as discussed herein either on the electronic device 120, or in combination with the cloud or server 130), and communicating with the communications circuitry 125 to obtain/provide information thereof with the cloud or server 130; and may include any of the processing for, but not limited to, the examples and embodiments as described below, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOW, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, a map application, a media application (e.g., QuickTime, MobileMusic.app, or MobileVideo.app), social networking applications (e.g., FACEBOOK®, INSTAGRAM®, TWITTER®, etc.), a calendaring application (e.g., a calendar for managing events, appointments, etc.), an Internet browsing application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
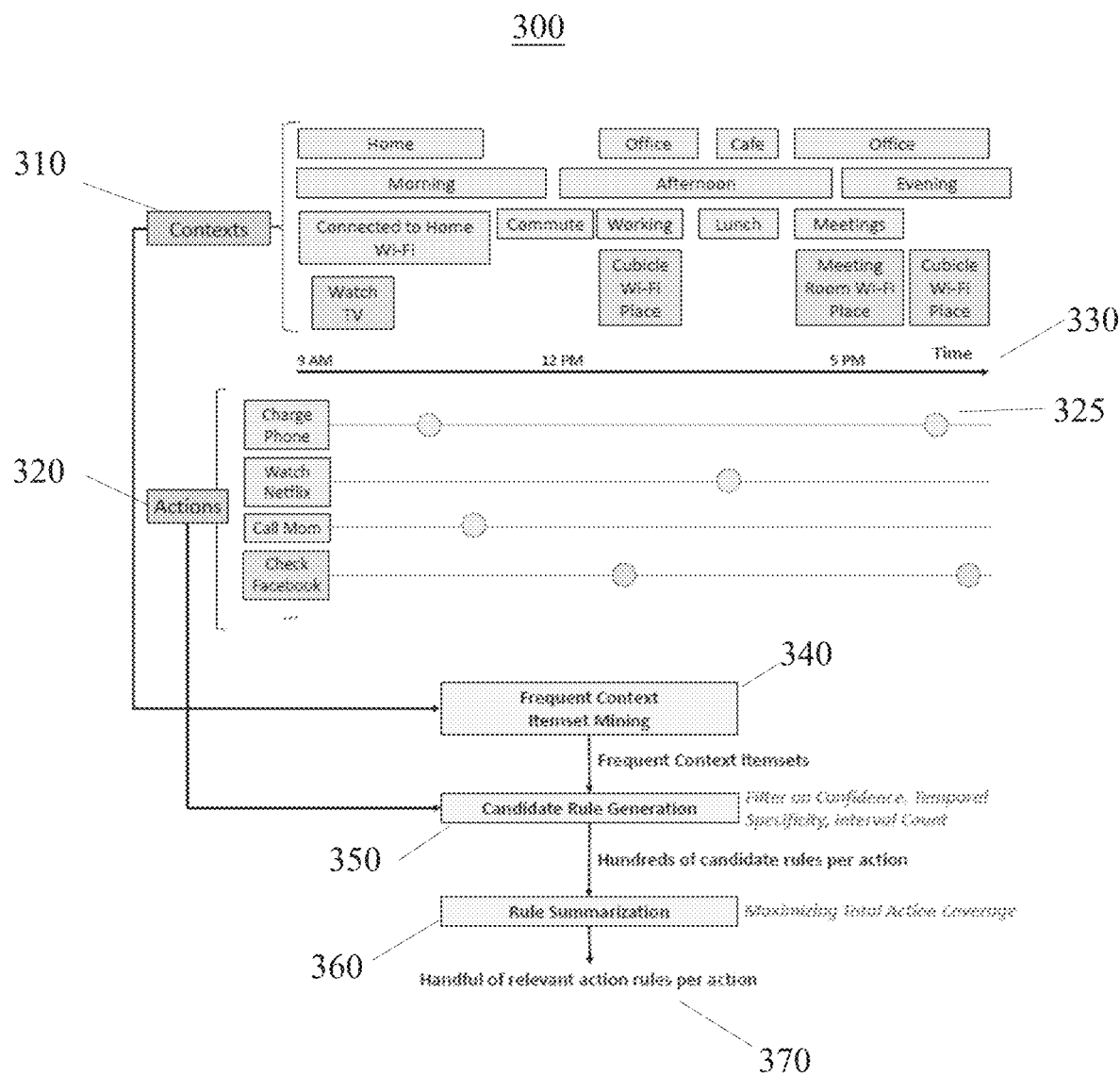
FIG. 3 shows a rule selector processing flow, according to some embodiments.

FIG. 3 shows a rule selector processing flow 300, which may be implemented by rule selector processing app 129, according to some embodiments. The inputs to rule selector processing are in two categories, background situational contexts 310 of the user, and the target user actions 320 for which selection of the conditional action rules are desired. The intervals are divided into, for example, morning, afternoon and evening according to time 330. The desired actions 320 are shown, for example, charge phone, watch Netflix®, call Mom, check Facebook®, etc. The selections 325 are shown, which are selectable along the line indicating time 330. The frequent interval itemset mining 340 processing of the rule selector processing mines frequent interval context itemsets to limit the possible set of pre-conditions for conditional action rules. The content-driven candidate action rule generation 350 processing generates high quality candidate conditional action rules. One challenge here is defining the right rule selection metrics to filter out low quality rules. The rule miner rule summarization 360 processing of the rule selector processing summarizes the potentially hundreds of candidate rules to a small set of conditional action rules 370 for selection by the end user.

In some embodiments, there are two sets of inputs to the rule selector processing, contexts 310 and actions 320. The set of contexts 310 (C), each context $c_i \in C$ has a unique context descriptor $c_i^d$ such as At Home, Morning, or Commuting, and contains a sequence of temporal intervals $c_i^T$ when that context is detected to be true. Contexts include situational status indicators such as the semantic location of the user, time segment of the day, or the activity of the user. For example, context $c_1$ representing the user being At Home is denoted as follows:

$$c_i = \{c_1^d \textit{ At Home}, c_1^T = [2017: \textit{Nov}:1:(12:23 \textit{ AM}-11:05 \textit{ AM}), 2017:\textit{Nov}:1:(7:02 \textit{ PM}-8:04 \textit{ PM}), \ldots]\}.$$

In some embodiments, the second input is a set of actions 320 (A). Each action $a_j \in A$ has a unique action descriptor $a_j^d$ such as Check Facebook® or Charge Phone, and contains a sequence of timestamps $a_j^T$ when that action is initiated by the user. The rule selector processing mines rules about actions 320 performed by the user as a function of the input contexts 310; it must be noted that unlike contexts 310 which are represented as intervals, user actions 320 are represented by instantaneous timestamps in order to mine rules about when the actions are initiated by the user. For example, action $a_3$ representing the user performing the Begin Charging action is denoted as follows:

$$a_3 = \{a_3^d = \text{Begin Charging}, a_3^T = [2017: \textit{Nov}:1:(10 \textit{ AM}), 2017:\textit{Nov}:1:(5:45 \textit{ PM}), \ldots]\}.$$

In some embodiments, based on the input contexts 310 and actions 320, rule selector processing generates a small, ranked list of co-occurrence conditional conditional action rules denoting the contexts in which the user performs a specific action. Each action rule r is defined as: $\{c_1^d, \ldots, c_k^d\} \rightarrow \{a^d\}$, where each $c_i \in C^d$ is a context descriptor and $a^d \in A^d$ is the target action descriptor predicted by the rule. The set $\{c_1^d, \ldots, c_k^d\}$ is called the pre-condition of the rule. An action rule indicates that the user frequently performs action $a^d$ with high likelihood whenever all the context descriptors $\{c_1^d, \ldots, c_k^d\}$ are simultaneously true. For example, the action rule {In Cubicle, Between 5-6 PM, Weekday, In Office, Battery Level<50%}→{Begin Charging} indicates that the user will likely begin to charge the phone when all the five context descriptors in the pre-condition are simultaneously true.

In some embodiments, the frequent context itemset mining 340 processing discovers a set of frequent context itemsets F using frequent itemset mining. A frequent context itemset $f \in F$ is defined as a subset of contexts in C that frequently co-occur together. Similar to the definition of a context itself, each frequent context itemset f has: (i) a descriptor $f^d$ that is a subset of context descriptors $C^d$, and (ii) a sequence of temporal intervals $f^T$ that indicates continuous time intervals when the context descriptors in $f^d$ co-occur in the input context 310 data. As an example, a period of time is observed when the four contexts of Watch TV, At Home, Morning, and Connected to Home Wi-Fi occur simultaneously. If these four contexts frequently co-occur together over the input context 310 dataset, a frequent context itemset $f_1 \in F$ is discovered that has the following properties similar to an atomic context in C: $f_1 = \{f_1^d = \{\text{At Home, Watch TV, Morning, Connected to Home Wi-Fi}\}$, $f^T = [2017: \text{Nov}:1:(9:03 \text{ AM}-9:40 \text{ AM}), 2017:\text{Nov}:2:(8:45 \text{ AM}-9:34 \text{ AM}), \ldots]\}$. To compute the frequent context itemsets, in one embodiment, the frequent context itemset mining 340 samples the input context 310 data at regular intervals of 1 second. It should be noted that the sampling interval does not affect the outcome of the processing and just needs to be smaller than the granularity at which contexts change. At each time sample t, the frequent context itemset mining 340 creates a co-occurrence context basket that contains all the context descriptors $c^d \in C$ whose temporal intervals occur at time t. The frequent context itemset mining 340 creates a list of co-occurrence context baskets B containing baskets for all time steps over the input context data. As an example, the input context baskets for the contexts represented in FIG. 3 would be as follows: [{At Home, Watch TV, Morning, Connected to Home Wi-Fi}, {At Home, Watch TV, Morning, Connected to Home Wi-Fi}, . . . {Commute from Home, Morning}, . . . , {Office, Afternoon, Working, At Cubicle Wi-Fi Place}, . . . ]. In some embodiments, the goal in this step is to discover all frequent subsets $f \subset C$ such that the context itemset f occurs more frequently than a support threshold in the input context baskets B. Usually the support threshold is expressed as a percentage of the number of baskets |B|. For example, a support threshold of 1% will discover frequent context itemsets that occur at least 1% of the time in the input context 310 data. To mine frequent context itemsets from the input baskets B, in one embodiment, a weighted itemset mining approach is used. Weighted itemset mining is very apt for this type of context 310 dataset with high redundancy in the input context baskets, created due to the continuous interval nature of mobile context data.

In some embodiments, the reason for mining frequent context itemsets F is that the frequent itemset $f \in F$ serve as pre-conditions in the conditional action rules mined in later processing. In particular, for each action rule $\{c_1^d, \ldots, c_k^d\} \rightarrow \{a^d\}$ output by the rule selector processing, the set of context descriptors in $\{c_1^d, \ldots, c_k^d\}$ correspond to the descriptor $f^d$ of a frequent itemset $f \in F$. By first mining for frequent context itemsets, the search for candidate conditional action rules is limited to only those rules where the pre-conditions are one of the frequent itemsets $f \in F$, rather than consider all possible $2^{|C|}$ subsets of the contexts C as potential pre-conditions. The intuition is that if a rule pre-condition does not occur in F, the action rule does not occur often enough in the user's life, and is therefore not worth selecting as an action rule for reminders or task automation.

In some embodiments, the rule selector processing generates conditional action rules differently than compared to, for example, pattern mining applications processing. In pattern mining applications, the conditional action rules are derived by adding both the contexts and actions in the input baskets; this creates problems while computing the confidence of conditional action rules, since actions such as app usage are far less frequent compared to longer term contexts such as being at home. In contrast, the rule selector processing explicitly separates context intervals and user actions, and only includes context intervals in the input baskets. The conditional action rules are then derived by searching over candidate rules which have frequent context itemsets as pre-conditions and actions as post-conditions, and satisfy the criteria for rule selection metrics defined below. In some embodiments, the rule selector processing produces a small set of less than seven conditional action rules per action for selection by the end user. In contrast, conventional pattern mining processing produces hundreds of patterns per action, and does not address the problem of rule summarization or rule selection by the end user.

Figures 4, 5:
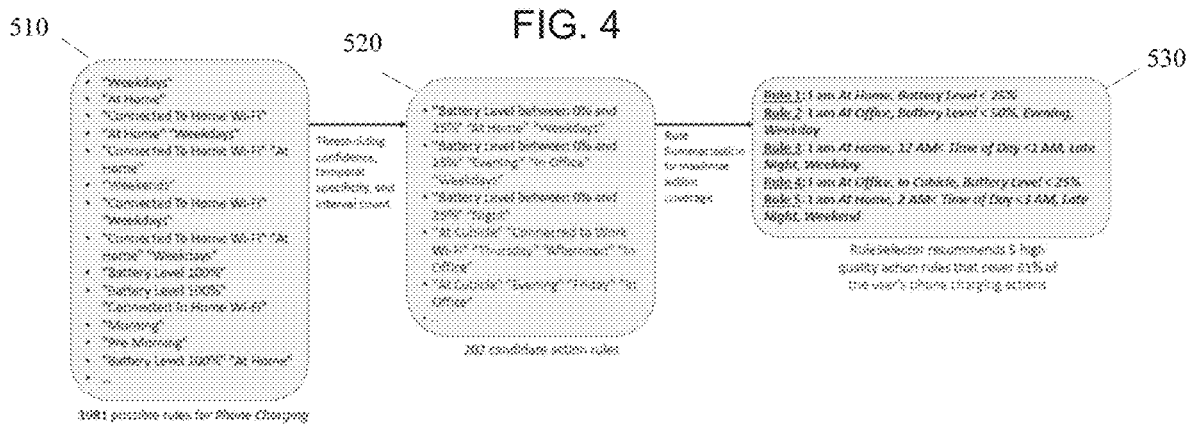
FIG. 4 shows an example table of rule selection metrics used in the rule selector processing, according to some embodiments.
FIG. 5 shows rule selection reduction and recommendation, according to some embodiments.

FIG. 4 shows an example table 400 of rule selection metrics used in the rule selector processing, according to some embodiments. The table 400 includes rule (selection) metrics 410, applicability 420 and definitions 430. In some embodiments, for rule metrics 410 the final conditional action rules R(a) for each action $a \in A$ are generated from the possible rules $f \rightarrow a$, where $f \in F$ is any frequent context itemset. In order to select a subset of the |F| possible conditional action rules for each action a, four rule metrics 410 are defined below. The rule metrics 410 are designed based on the common concerns of smartphone users while selecting conditional action rules for reminders or automation.

In some embodiments, the first rule metric 410 of rule confidence measures the likelihood of the user performing action a, when the context descriptors in the pre-condition frequent context itemset f are true. More precisely, as seen in table 400, rule confidence measures the proportion of temporal intervals in $f^T$ that contain some instance of action a from $a^T$. Unlike conventional pattern mining processing, which measures rule confidence based on individual baskets, in some embodiments, rule confidence is measured using the temporal intervals of the context pre-conditions, thus solving the problem of unbalanced durations of context intervals and user actions in conventional pattern mining. For example, consider the action rule: $f_1=\{$In Cubicle, Between 5-6 PM, Weekday, In Office, Battery Level<50%$\} \rightarrow \{$Begin Charging$\}$. Over a data collection period of, for example, one month, assume that the pre-condition frequent context itemset f in rule $rr_1$ with $f^d=\{$In Cubicle, Between 5-6 PM, Weekday, In Office, Battery Level<50%$\}$ occurs every weekday for a total of 20 unique intervals; in other words, $|f^T|=20$. If the user charges her phone 15 out of those 20 intervals, then the rule confidence is measured to be 75%. Rule confidence is an important factor for users when ranking and selecting rules. Reasonable variability observed in user preferences for rule confidence depends on the user and the action. For reminder applications, some users do not mind a lower confidence value of 65-75%, especially for habits that they would like to alter, such as remembering to charge their phones at work in the afternoon. On the other hand, users prefer a very high confidence for action automation in order to avoid unexpected behavior.

In some embodiments, the rule metric 410 of contextual specificity measures how temporally precise the pre-condition contexts in frequent itemset f are. As seen in table 400, the lower the number of temporal baskets $b \subset B$ in which f appears, the higher the contextual specificity. In other words, higher contextual specificity is associated with frequent context itemsets which occur for relatively short time durations. For example, consider the action rule $r_1=\{$Weekday$\} \rightarrow \{$Begin Charging$\}$. The pre-conditions frequent itemset f with $f^d=$Weekday will occur in 5 out of every 7 baskets in B over the 5 weekdays. Therefore, the contextual specificity of this rule is only 28.57%. On the other hand, the pre-condition in action rule $r_2=\{$In Cubicle, Between 5-6 PM, Weekday, In Office, Battery Level<50%$\} \rightarrow \{$Begin Charging$\}$ occurs at most one out of every 24 baskets assuming that this interval repeats daily for the full hour; therefore, the contextual specificity of this rule is much higher at 95.83%. In some embodiments, contextual specificity is one of the most important metrics for users in selecting rules as users prefer reminders in the most relevant times and contexts, and do not desire to be interrupted when the reminder is not appropriate. For example, users would much rather receive a charging reminder from rule $r_2$ above compared to a reminder from rule $r_1$ at a random time on a weekday.

In some embodiments, another important consideration for users in selecting rules is simply the number of unique instances when the rule occurred. Interval count measures the number of unique temporal intervals from the subset of $f^T$ when action a occurred. When presenting interval count to the user, it is normalized to be the interval count per week. For this metric again, variability in user preferences may be found depending on the target action. For actions such as charging a smartphone that the user performs frequently, users prefer a high interval count per week while selecting rules. For actions such as ordering from food delivery services, which the user only performs once or twice a week, users tolerate much lower interval counts per week.

In some embodiments, the rule metric 410 of total action coverage measures the proportion of instances of action a covered by the set of rules R(a) recommended for action a by rule selector processing. Unlike the other three metrics discussed above, total action coverage applies to a set of rules rather than a single rule, and is useful in comparing different sets of rules before presenting to the user. More formally, as seen in table 400, total action coverage measures the proportion of action instances in $a^T$ that occur in some pre-condition frequent context itemset interval $f^T$, where f→a is a rule included in R(a). To illustrate the idea of action coverage, consider three conditional action rules:

$r_1$={*In* Cubicle, Between 5-6 *PM*, Weekday, *In* Office, Battery Level<50%}→{Begin Charging}

$r_2$={Weekday, Evening, Battery Level<50%}→{Begin Charging}

$r_3$={*At* Home, Late Night}→{Begin Charging}

Each of these rules covers a different subset of the action instances from the set $a^T$. For example, assume rule $r_1$ covers 15 instances of the user charging her phone and rule $r_2$ covers 22 unique instances; the total action coverage of the two rules is the union of the two sets with 15 and 22 action instances respectively. Since both rules are related to charging the phone in the evening, it may be found that the union of these two rules covers only 23 unique instances of the user charging her phone. On the other hand, rules $r_2$ and $r_3$ cover more diverse scenarios for charging the phone, namely evening and late night charging patterns at home; so these rules together may cover, for example, 40 instances of the user charging her phone. Thus, the total action coverage of the set of rules $\{r_2, r_3\}$ is higher than the action coverage of the set $\{r_1, r_2\}$. Action coverage is a useful factor for end users in selecting rules. Since action coverage enforces some diversity in the set of rules presented, users have more opportunities in selecting diverse conditional action rules such as charging reminders for both home and work, and/or obtaining more examples of context pre-conditions in order to define their own rules.

FIG. 5 shows rule selection reduction and recommendation, according to some embodiments. In some embodiments, rule selector processing first eliminates a significant proportion of rules by thresholding on three rule (selection) metrics 410 (FIG. 4), and then summarizes rules to eliminate redundancy and maximize action coverage. As shown in FIG. 3, the goal of candidate rule generation 350 is to generate high quality candidate conditional action rules from the set of all possible |F| conditional action rules for each action. To generate high quality candidate rules for each action a, in some embodiments only a subset of possible conditional action rules are selected from F that satisfy a minimum threshold on three rule selection metrics discussed above: confidence, contextual specificity, and interval count. FIG. 5 shows the number of rules reduced by candidate rule generation 350, for an example user and the target action of Begin charging. Initially there are 1981 possible conditional action rules 510 for Begin charging, where the target action occurs at least once during a frequent context itemset from F. The candidate rule generation 350 processing applies minimum thresholds on three rule selection metrics to reduce the number of high quality candidate rules to only 202 conditional action rules 520. The rule selector processing treats the three quality metrics of confidence, contextual specificity, and interval count as independent parameters that the end user can control by setting minimum thresholds. The fourth metric of total action coverage is treated as a dependent variable that the user cannot really control, and is an optimization metric that the rule summarization 360 processing attempts to maximize as much as possible. The reasoning behind this is that users may care most about controlling contextual specificity, and interval count independently. If the users were not satisfied with the action coverage provided by the rule selector processing, they naturally try to reduce their threshold parameters for independent variables metrics such as interval count to see if more rules are generated to cover more of the user's actions.

A key challenge in candidate rule generation is to decide the threshold parameters for each of the three rule selection metrics. In some embodiments, a rule selector user interface described below provides the end users to control the threshold parameters for each metric. The reasoning behind this is that there may not be a single threshold setting for each metric that satisfy all users; for example, for the begin charging event, some users may select rules with a lower interval count and other users may select rules with a higher confidence and interval count per week. Even for a single user, users may prefer different threshold settings for different target actions; for example, a higher interval count for begin charging actions and lower interval count per week for order from DOORDASH® actions.

In some embodiments, the goal of rule summarization 360 (FIG. 3) processing is to generate a handful of diverse conditional action rules to present to the user, with the goal of maximizing total action coverage and eliminating rule redundancy. The rule summarization 360 processing eliminates significant redundancy in the conditional action rules, and generates a small set of conditional action rules that cover all of the action instances covered by the candidate rules. For the begin charging example in FIG. 5, the 202 candidate conditional action rules 520 are summarized to a much smaller set of 5 rules 530 that cover all of the 81% of the user's charging actions originally covered by the larger set of 202 rules 520. Consider a set of high quality candidate conditional action rules R(a) for action $a \in A$, generated by candidate rule generation 350 (FIG. 3) processing. Assume these conditional action rules cover a subset $aT \subset a^T$ of the action instances of a. The goal of rule summarization 360 processing is to find a smaller, summarized set of rules R(a) that covers as many of the possible set of action instances aT covered by R(a). Since each rule in R(a) covers a different subset of action instances in aT, and the goal is to find a subset of rules $R(a) \subset R(a)$ that covers as many of the action instances covered by aT, this optimization problem reduces to the nondeterministic polynomial time (NP)-complete problem of finding the set cover. To solve this NP-complete problem, in some embodiments a well-known greedy solution is leveraged that incrementally adds rules to R(a), where at each processing step, the rule that covers the largest number of uncovered action instances in aT is added; rules are no longer added when no uncovered action instances can be covered by adding a new rule. The greedy solution is shown in Algorithm 1 below and is in $O(n^2)$, where n=|R(a)| is the number of high quality candidate conditional action rules input to the rule summarization algorithm; a brute force approach would require a prohibitively high time complexity of $O(2^n)$ to analyze all $2^n$ possible rule subsets to see which subsets have a higher action coverage. In algorithm 1 below, coverage(R) computes the total action coverage of the rules in set R; in some embodiments, look-up dictionaries are maintained for each rule containing action instances covered by that rule, allowing to efficiently compute the action coverage of any set of rules R.

ALGORITHM 1:
Rule summarization 360 processing of rule selector processing

```
Inputs: Set of candidate conditional action rules R(a) for action a
Output: Set of summarized conditional action rules R(a) ⊂ R(a)
1 Set summarized rule set R(a) = { }
  while |R(a)| > 0 do
2   select rule r̄ ∈ R(a), such that
      r = arg maxr ∈R(a) coverage(r ∪ R(a))
      if coverage(r ∪ R(a)) = coverage(R(a)) then
3     break
4   end
5   add rule r to set R(a)
      remove rule r from set R(a)
6 end
7 Output summarized rule set R(a).
```

Rule summarization is another important part of processing in the rule selector processing. Instead of presenting 50-100 candidate conditional action rules to users, less than 10 summarized, diverse conditional action rules that typically capture all of the action instances covered by the candidate rules are presented. It is easier and more helpful for the users to browse the diverse, summarized conditional action rules as opposed to a large number of redundant candidate rules. Additionally, if one of the rules that the user actually desired was removed as a redundant rule, users were able to easily modify a closely related rule output by rule selector processing to satisfy their needs using the rule modification user interface discussed below.

In some embodiments, rule selector processing is implemented in the rule selector processing app 129 (FIG. 2) using a thin mobile client and cloud/server 130 architecture. Mobile context and action data is logged on a smartphone and uploaded periodically by the mobile device to a cloud/server 130 database. On the cloud/server 130, further context inference is performed based on the raw sensor data logged, including contexts such as Wi-Fi places, significant semantic places, and activities such as commuting. The rule selector processing then runs on the cloud/server 130 over the context and action data logs to generate summarized conditional action rules. The user interface details of how rule exploration provides users to browse, modify, and select conditional action rules is discussed below. In some embodiments, the rule selector processing may be implemented as a Java jar library, running the rule selector processing entirely on the mobile device 120 (FIG. 2) is possible.

For analyzing rule selector processing performance, mobile user contexts and actions are collected. The list of mobile actions and contexts collected are listed below. Two different mobile user datasets are used for the analysis. Online, quantitative performance aspects of the rule selector processing based on data collected from 200 users of selective smartphones were collected for 100 days each. A data collection tool is used to collect the same contexts and actions shown below for a smaller set of smartphone users. The list of contexts collected include: Semantic place: Home/Work/Significant location ID, Wi-Fi Place: At Cubicle/Wi-Fi Place ID, Temporal Intervals: Time segment (morning, afternoon, . . . ), Weekday/Weekend, Day of Week, Hour of Day (0-23), Battery Level: Discretized into multiple bins (0-25%, 25-50%, 0-50%, . . . ), Activities: Obtained using Android activity recognition API, Commuting from home and from office as an additional activity, and Connected Wi-Fi network's SSID name. The list of actions collected, and for which users select rules include: App usage: Name of the app launched, Call action: Anonymized ID of contact called, SMS action: Anonymized ID of contact messaged, and Begin charging: Charge phone action. In the above list of contexts and actions, it is noted that many of the contexts and all of the actions can be logged using APIs. Below, the three major contexts that are inferred by the rule selector processing from the raw sensor data: Wi-Fi places, significant semantic places, and the commuting activity, are discussed.

Using a Wi-Fi scan similarity metric, Wi-Fi place entrances and departures are detected, and then each Wi-Fi place visit is clustered to a common set of significant Wi-Fi places. In order to address some of the performance shortcomings of the approach, the union Tanimoto Wi-Fi distance metric is replaced with the intersection Tanimoto distance; the intersection distance metric computes the Tanimoto distance only between the common MAC addresses in two Wi-Fi scans, thus reducing place clustering errors due to missing MAC addresses. Also, the idle activity inferred from the activity recognition API is leveraged to enforce all Wi-Fi scans in an idle interval to be part of the same Wi-Fi place; this heuristic improves the accuracy of Wi-Fi place detection further. For each Wi-Fi place detected, the place ID a is used as a context in rule mining. The cubicle place is added as a context by labeling the Wi-Fi place in which the user spends the most time during the day when at work (detected using semantic place detection below) as the cubicle.

Detecting significant places from streams of latitude/longitude location data is a well explored topic within the ubiquitous computing community. In some embodiments, the algorithm detects place visits based on GPS logs and then clusters individual place visits into significant location clusters. The rule selector processing only retains location clusters at which the user spends at least five minutes. Five minutes is selected as a lower boundary for detection of potentially significant places at which the user only spends short amount of time such as a coffee shop in the morning. Each non-empty distance cluster is assigned a unique significant location ID, and used as a context for rule mining. To deal with missing and stale location data, the result of the Wi-Fi place detection algorithm is fused with the significant semantic place detection using GPS logs. Since a majority of locations nowadays have nearby Wi-Fi networks, this approach solves a number of data problems that would otherwise corrupt significant location detection using GPS data alone. After the data is clustered into significant locations, a heuristic-based approach is used to determine home and office locations. An assumption used is that locations where the user spends a significant amount of time during the night is their home location and locations they spend a significant amount of time on weekdays between 8 am and 6 pm is their office location. In addition, a Factual is used to label non-office and non-home places with semantic merchant tags when available, such as SAFEWAY® or WAL-MART®.

Using the above described significant semantic place detection processing, an inference of when a user is commuting is used in some embodiments. Commute detection is based on two pieces of information: 1) in-vehicle activity recognition data obtained from GOOGLE® activity recognition API and 2) the home and office location inferred by significant semantic place detection. To identify commuting, a heuristic is used as follows: if the last observed location was home and it is a weekday morning, classify the activity as commute to work, and if the last observed location was office and it is a weekday evening, classify the activity as commute from work.

In some embodiments, in the rule selector processing a single threshold value is not assigned to the three independent rule selection metrics of rule confidence, contextual specificity, and interval count. Instead, the user is provided to select each parameter threshold using a user interface. Since it is not reasonable to expect non-expert users to fully explore the space of possible parameter thresholds, in some embodiments three convenient threshold settings (low, medium, and high) are provided for each of the three metrics as shown in table I below. The threshold settings for low, medium, and high, are selected based on preliminary discussions with sample subjects to understand their requirements, and also based on empirical differences in the set of rules generated by the rule selector processing for each threshold setting. Thresholds were avoided that were too high or too low to produce any rules at all or any rules useful to the end user.

TABLE I

|  | Confidence | Contextual specificity | Interval Count |
| --- | --- | --- | --- |
| Low | 65% | 75% | 0.1 |
| Medium | 75% | 85% | 1.5 |
| High | 85% | 98% | 2.5 |

In some embodiments, given the 3 parameters and threshold settings in table I, there are 27 possible parameter combinations that users could possibly explore. The impact of these parameter thresholds are analyzed based on the number of candidate rules and final summarized rules generated by the rule selector processing. Table II shows the number of rules for three representative parameter settings: all thresholds set to low, medium, and high respectively, for the same sample users. In the example analysis, it is noted that there are more than 2000 possible rules per action. In some embodiments, rule generation applies the rule selection metric thresholds that the smartphone users care about to significantly reduce the possible rules to a set of high quality candidate rules. For the low and medium settings, it is observed that the number of candidate rules is still too high to present to the end user, at 469 and 45 respectively. In some embodiments, the rule selector processing summarizes these candidate rules to less than ten rules for presentation to the user.

TABLE II

| Parameter Setting | Possible Rule Count | Candidate Rule Count | Summarized Rule Count |
| --- | --- | --- | --- |
| {Low Confidence, Low Specificity, Low Interval Count} | 2373.6 | 469.2 | 9 |
| {Medium Confidence, Medium Specificity, Medium Interval Count} | 2373.6 | 45.6 | 6.6 |
| {High Confidence, High Specificity, High Interval Count} | 2373.6 | 1.8 | 1.0 |

Table III provides an evaluation of how well the rule selector processing maximizes the action coverage for the medium setting for all parameters, over the 200 sample smartphone users from the sample dataset. On average, there are 20 actions per user with high quality candidate rules, and there are 66 candidate rules per action on average. These candidate rules cover 74.5% of the user's unique action instances. The rule selector processing can cover all of the action instances covered by the 66 rules in only 6-7 rules; this is highly appreciated by the sample users since they are able to browse and select from a much smaller set of diverse conditional action rules.

TABLE III

| Rule Type | Number of Actions with Rules | Number of Rules per Action | Total Action Coverage |
| --- | --- | --- | --- |
| Possible Rules | 119 | 226 | 100% |
| High Quality Candidate Rules | 20 | 66 | 74.5% |

FIG. 6 shows a table 600 of example common rules across a population, according to some embodiments. In table 600, the number of common actions and common rules are analyzed as the percentage of the user population that share the actions and rules are varied. Overall, it can be observed that there are very few common actions and rules across the sample users. For example, when only 20% of the user population is looked at, it can be observed that the common actions with high quality rules across the sample users significantly drops from 258 actions to only 11 actions. As a result, the number of common rules shared across users also drops significantly. Overall, it is observed that only 4 rules are applicable to more than 50% of the users, and only 15 rules are applicable to more than 30% of the users.

Figure 7:
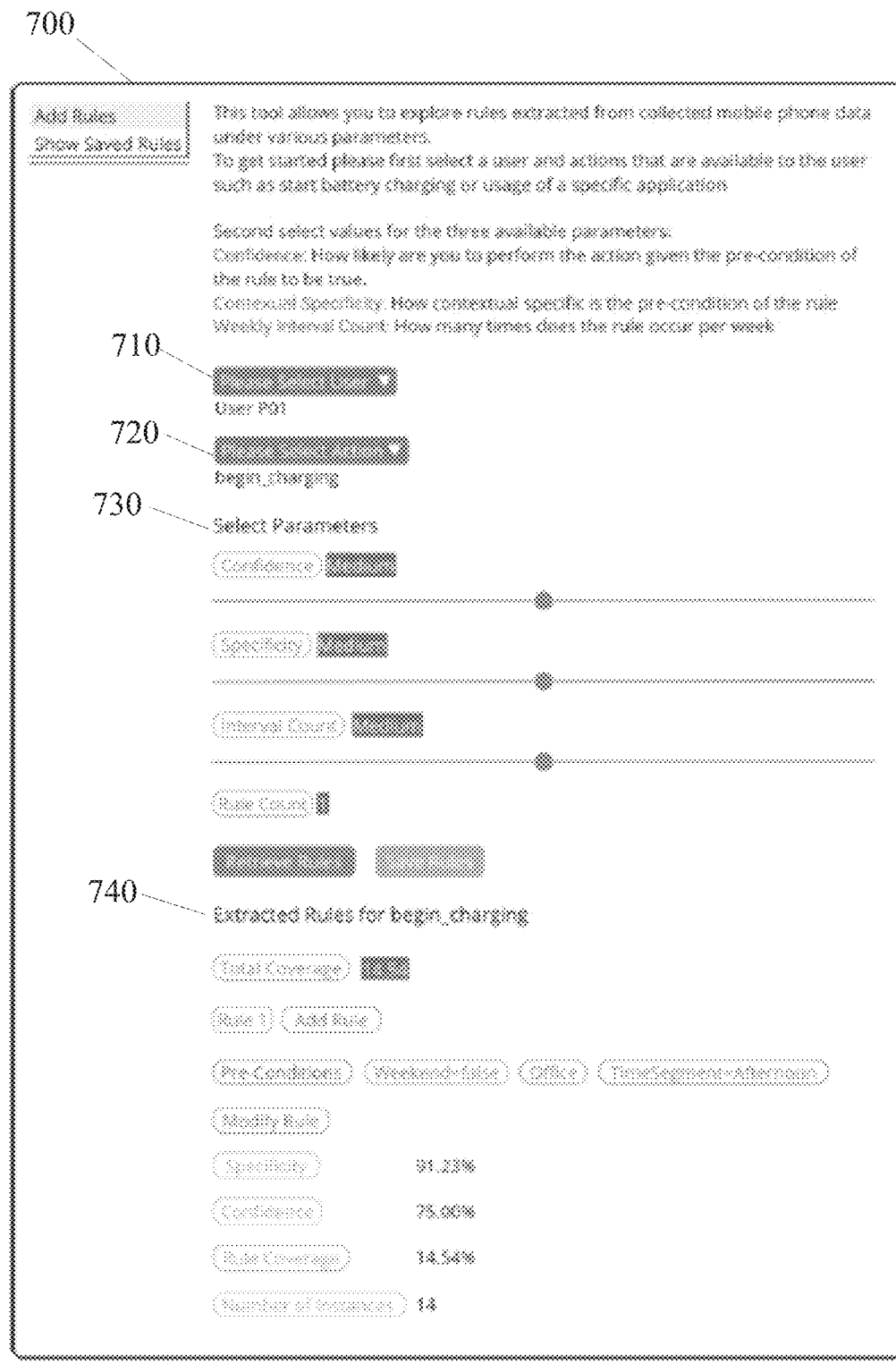
FIG. 7 shows an example interface for the addition of rules, according to some embodiments.

FIG. 7 shows an example interface 700 for the addition of rules, according to some embodiments. In some embodiments, the rule selector processing includes the web-based user interface 700 that allows users to browse the summarized rules generated, modify rules as necessary, and save a final list of conditional action rules for automation. In some embodiments, the interface 700 may include a user selection 710, action selection 720, parameter selection 730, and display of determined rules 740. The interface 700 allows the user to retrieve the summarized rules by first selecting the target action (e.g., begin charging, order from food delivery service, etc.), and the threshold parameters (i.e., low, medium, and high) for the three rule selection metrics. As shown in Table I, the threshold selection may be limited to three predefined values to make the exploration easy for non-expert users. After selecting the threshold settings, a user has the option to retrieve rules under varying parameter combinations and add them to a rule list for each action via interface 700, review the saved rule list for each action via interface 900 (FIG. 9), and modify rules if necessary before saving via interface 1000 (FIG. 10). The modification interface 1000 allows users to remove contexts in the precondition and add new contexts as desired. Also, the exploration logs various user actions including: the selected parameter values used to retrieve and browse rules, which rules are saved, and if rules are modified, the original and modified rule versions.

Figure 8:
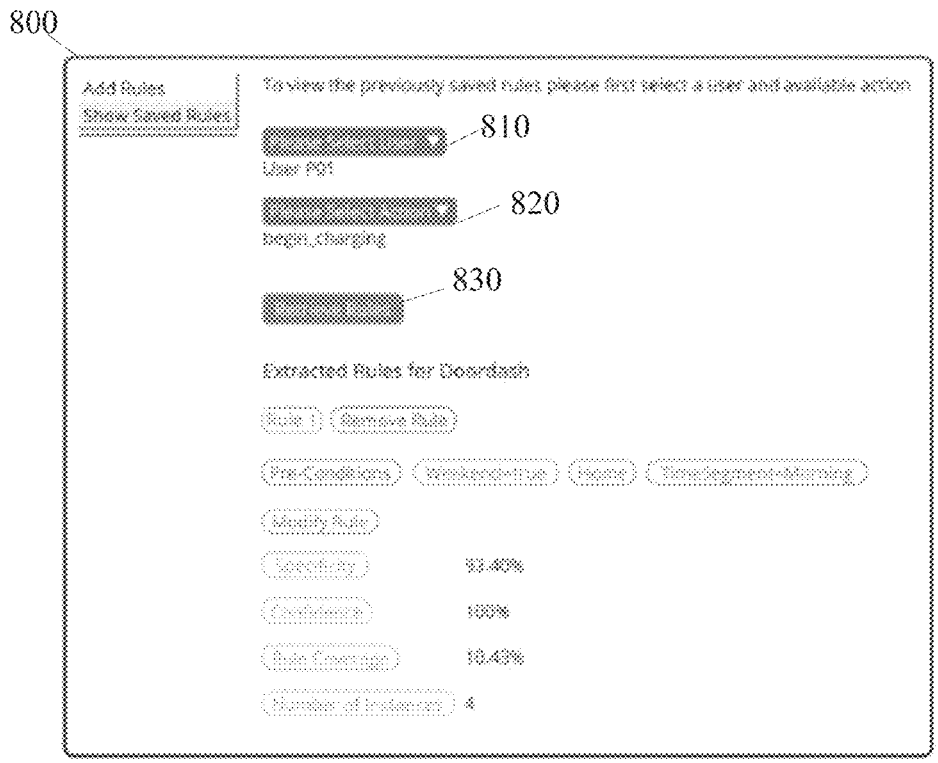
FIG. 8 shows an example interface for saved rules, according to some embodiments.

FIG. 8 shows an example interface 800 for saved rules, according to some embodiments. The interface 800 may include user selection 810, action selection 820 and retrieving rule selection 830.

Figure 9:
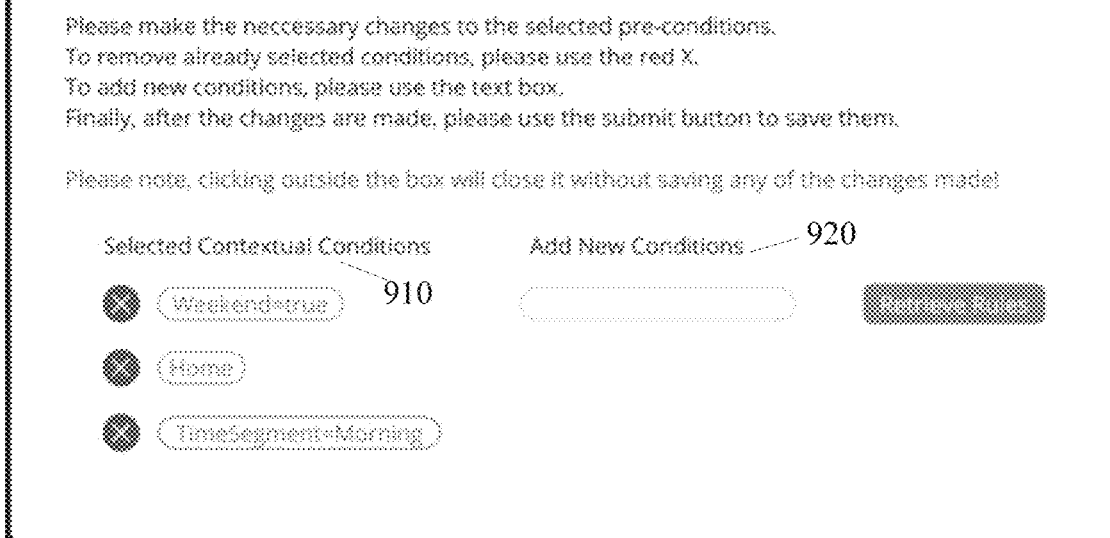
FIG. 9 shows an example interface for modification of rules, according to some embodiments.

FIG. 9 shows an example interface 900 for modification of rules, according to some embodiments. The interface 900 may include display selection for contextual conditions 910 and addition of new conditions 920.

In some embodiments, users are assigned different priorities to individual rule selection metrics, dependent on personal preferences and the target action. Users may select parameter settings depending on the action, and may modify rules to adjust them to their needs and goals. In some embodiments, having fine grained context available increases the utility of rules.

It is noted that users usually prefer to use rules for (i) reminders (such as charging reminders), (ii) recommendations (such as restaurant recommendations from food delivery services), and (iii) notifications (such as low priority notifications from social media apps). These applications help prevent a very negative user experience such as a phone with low battery charge. In fact, battery charging reminders were consistently evaluated as useful to highly useful by sample users. In addition, users complained how they ended up turning off notifications for certain applications since they overloaded them with messages that came at the wrong time in the wrong situation. A more rule-based intelligent notification approach will help with this problem by limiting notifications from certain apps to certain relevant contexts, such as social media app notifications Outside of 8 AM-6 PM on working weekdays (P07) and DOORDASH® recommendations only on Friday evenings and Saturday mornings (P01). Some embodiments provide meaningful shortcuts to important applications. For example, being able to access map applications while driving is of great importance. Similarly users may prefer to have easy shortcuts to video applications while they eat lunch at work. A rule-based assistant should be designed around the three use cases discussed above, but still allow for flexibility to allow a different set of future use cases.

FIG. 10 shows an example table 1000 of smart TV rules for an exemplary user, according to some embodiments. In some embodiments, the rule selector processing may be applied for smart appliances, such as a smart TV system. Reminder rules may be set up, for example, for favorite programs, sub-genres such as news, channels, etc. Rules may be set up for when to show recommendations for certain genres, such as movies, sitcoms, etc. The table 1000 includes example targeted actions 1010 and summarized rules 1020. Other rules may be set up for recordings for programming (e.g., from set top boxes). Summarized rules may be generated for various target actions such as watching a movie, news, or a specific channel or movie genre. Such rules could be quite useful in allowing viewers to automate their TV actions, or receive pattern-aware recommendations about content they may be interested in watching currently based on their behavior patterns.

FIG. 11 shows an example table 1100 of context-driven rules for an exemplary user, according to some embodiments. In some embodiments, a TV user interface may be personalized for different relevant contexts. User actions may be predicted and action shortcuts may be provided in appropriate contexts. Content may be recommended based on predicted user actions (for example, recommendations for sitcom vs. movies). As shown, the table 1100 includes example input contextual intervals 1110 and relevant actions 1120.

Figures 12A, 12B, 12C:
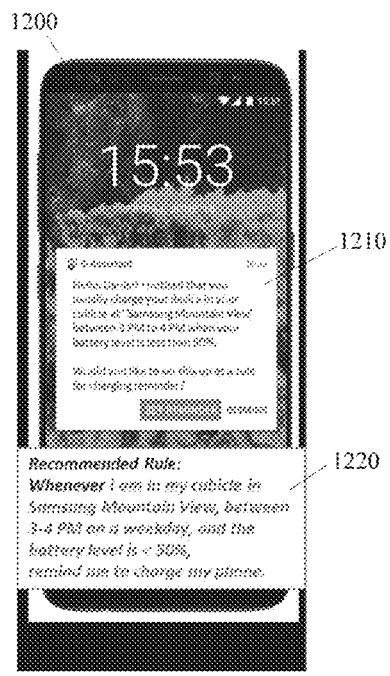
FIGS. 12A-C shows smart device example usage for rule setup, rule invocation and a personalized reminder, according to some embodiments.

FIGS. 12A-C shows smart device 1200 (e.g., electronic device 120) example usage for rule setup, rule invocation and a personalized reminder, according to some embodiments. FIG. 12A shows an example display suggestion 1210 based on a pattern that the user usually charges their device in the office cubicle between 3-4 PM when the battery is less than 50%. The recommended rule 1220 would be based on the usage pattern indicated in the suggestion 1210. In some embodiments, once the user accepts the suggested conditional action rule, the smart device 1200 may perform an automated action or communicate the automated action to another device causing that device to perform an action, when conditions are satisfied.

FIG. 12B shows an example display reminder 1211 based on the recommended rule 1220, and indicates that the battery is less than 50% and the user should charge their phone when in their cubicle in their office between 3-4:30-PM based on the invoked rule 1221.

FIG. 12C shows a message and reminder 1212 based on the user pattern and the recommended rule 1222 that whenever it is Sunday morning, the weather is sunny and the temperature is greater than 15° C., with no chance of rain, present a reminder to go for a run. Also displayed may be an indication 1230 of weekly summarized steps, miles, calories, etc.

Figure 13A:
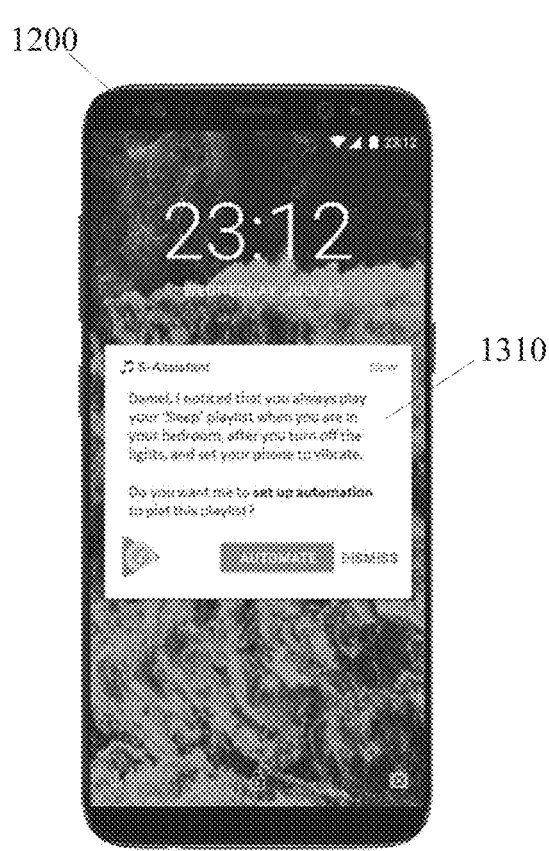
FIGS. 13A-B shows smart device example usage for automating user actions by deriving complex personalized rules, according to some embodiments.
Figure 13B:

FIGS. 13A-B shows smart device 1200 example usage for automating user actions by deriving complex personalized rules, according to some embodiments. In FIG. 13A, the message and query 1310 informs the user of a pattern that the user plays a "sleep" playlist when they are in their bedroom after the lights are turned off, and the smart device 1200 is set to vibrate, and recommends setting up a rule to play the "sleep" playlist when the context is met. In FIG. 13B, another message and query 1311 informs the user that they always cast CNN® on their TV when they get home and were watching/listening to CNN® on the commute home, and recommends setting up the automated cast of the action.

Figure 14A:
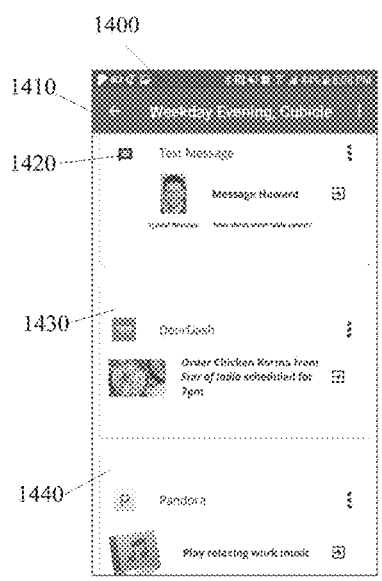
FIGS. 14A-C shows smart device example usage for anticipating user actions and presentation of contextual action cards/shortcuts, according to some embodiments.
Figure 14B:
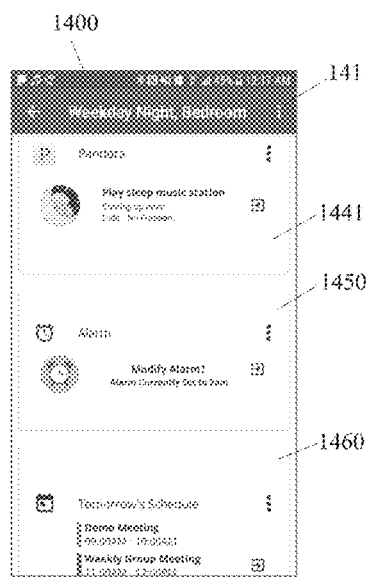
Figure 14C:
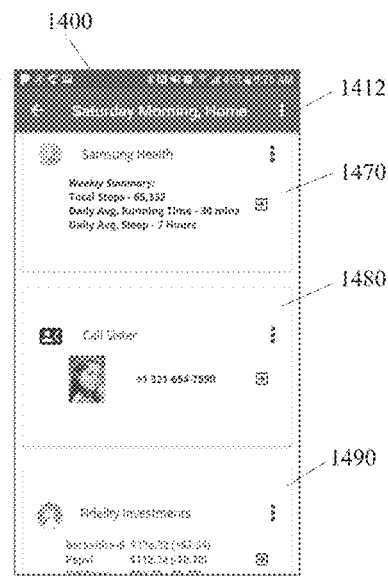

FIGS. 14A-C shows smart device 1400 (e.g., electronic device 120, FIG. 2) example usage for anticipating user actions and presentation of contextual action cards/shortcuts, according to some embodiments. FIG. 14A shows the context 1410 of a weekday evening and the user is in their cubicle. Based on the context 1410, the rule selector processing may provide the following recommendations: recommendation message 1420 to message a friend "How about some table tennis?"; recommendation message 1430 to order a specified meal from DOORDASH®; and/or a recommendation message 1440 to play relaxing work music. Each of the recommendation messages 1420, 1430 and 1440 may be activated from the smart device 1400, for example, by selecting the indicator arrows. A user can set up some of the recommended message as a rule (e.g., at a certain time, play sleep music, call sister, turn light to dim, etc.), and the UI can further allow the user to set a duration for effecting the rule.

FIG. 14B shows the context 1411 of a weekday night and the user is in their bedroom. Based on the context 1411, the rule selector processing may provide the following: recommendation message 1441 to play sleep music station; message 1450 querying whether to modify the alarm setting; and a message 1460 showing tomorrow's schedule. Each of the messages 1441, 1450 and 1460 may be further explored or activated from the smart device 1400, for example, by selecting the indicator arrows.

FIG. 14C shows the context 1412 of a Saturday morning and the user is at home. Based on the context 1412, the rule selector processing may provide the following message 1470 showing a health summary; recommendation message 1480 querying whether to call the user's sister; and a message 1490 showing a summary of investments. The messages 1470, 1480 and 1490 may be further explored or activated from the smart device 1400, for example, by selecting the indicator arrows. In one embodiment, the rule selector processing may adjust a rule confidence parameter based on the type of application/domain.

In some embodiments, rule selector processing may be applied to other domains, such as public context datasets from two domains (smart homes and smart TVs), and to data from a clinical study on using smartphones to improve mobility among elderly patients. The rule selector processing may generate personalized rules based on smart home sensor data. Assume information is collected from two residents, R1 and R2. The contexts may be set to be smart home user activities and room occupancy, and the actions may be set to light usage, door open/close, and using specific shelves of the kitchen. In one example, the kitchen shelf 2 item may be indicative of cooking, and is primarily used on weekday afternoons by resident R2 while resident R1 is sleeping. The kitchen light may be used when resident R1 is not home, working or sleeping, which may strongly indicates that resident R2 seems to use the kitchen more for meal preparation. The example rule selector processing rules generated by smart home events may potentially serve advanced features for smart appliances. For example, knowing rules about when R2 is in the kitchen could help set up when a smart appliance (e.g., a smart refrigerator) should notify about recipe recommendations and meal planning ideas for the family. As another example, user patterns may be used to set up automatic schedules for heating and lighting systems. In some embodiments, rule selector processing determines both personalized rules for a single user, and for multiple users, such as users in a family, a user segment (e.g., 'all males between 20-25,' etc.) or common rules for the entire user population. For each domain (e.g., smart homes, medical, smart TV, etc.), rule selector processing may select conditional action rules as long as the data from each domain is presented as (i) a sequence of actions (such as 'go for a run,' 'watch action movie,' etc.) for which it is interested in mining rules for, and (ii) a set of background context intervals that are true whenever each action is performed (e.g., 'in bedroom,' 'sunny weather,' 'Friday night,' etc.).

Since users have diverse preferences for rule selection parameters for actions, a live smartphone system has to learn user preferences for parameters without burdening the user with too many rule suggestions. In some embodiments parameter learning for rule selection may be implemented and use leveraging techniques such as active learning or re-inforcement learning. Users tend to not only modify rules by removing unnecessary conditions, but also by adding new context to those rules. Another aspect that may be implemented by some embodiments is sequential rules that capture a sequence of actions as opposed to a co-occurrence. For example, a user may look up potential restaurants using an app before posting a link to into a chat. This sequence of checking the app and posting of links happens until a consensus for the restaurant is reached. By learning this routine a rule-based chat client can offer helpful direct connections to applications that make the overall user interaction more convenient. In general, sequential pattern mining is computationally more expensive co-occurrence mining, and also outputs a larger number of candidate rules for automation; these factors make sequential rule summarization quite challenging. Some embodiments may implement use of periodic patterns, such as monthly patterns for shopping at particular stores or websites. Once a rule is accepted by the user, rule selector processing may present a UI notifing the user of significant changes in a mined pattern and prompt the user whether to update the rule or maintain it. In one example embodiment, users are notified whenever their selected rules are invalid since the rules no longer reflect users' behavior. In such cases, a suggestion is provided to the user to delete the rule or modify it based on the current user behavior. For example, the user selects a rule to remind her to call her parents on Saturday evenings. The user behavior may change over time, and the user ignores the reminder, and frequently calls her parents on Sunday night. In such an example, the rule selector processing notifies the user to suggest her to change the 'call parents' reminder from Saturday evening to Sunday night.

Figure 15:
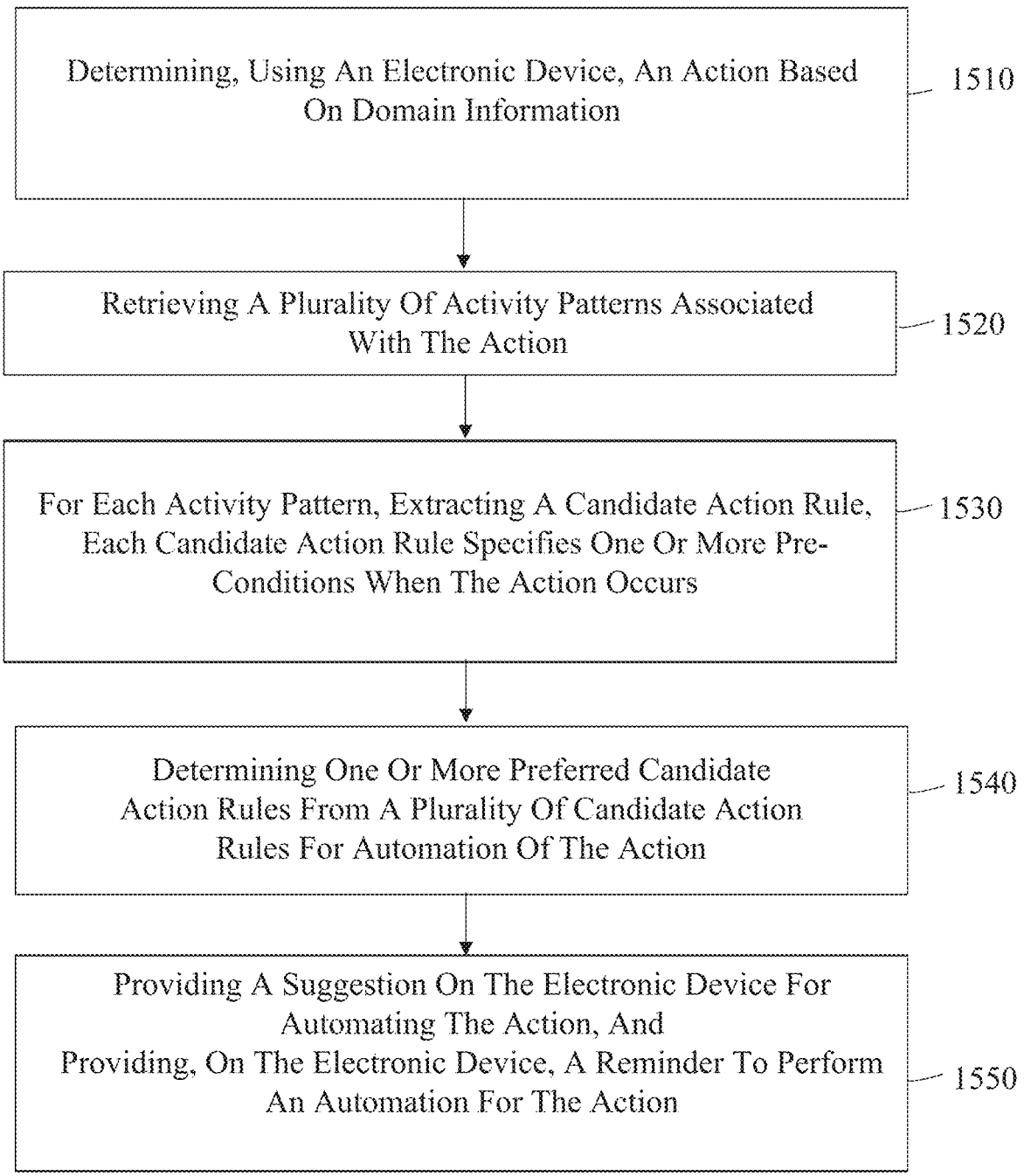
FIG. 15 shows a block diagram of a process for determining preferred rules for action automation, according to some embodiments.

FIG. 15 shows a block diagram of a process 1500 for determining preferred rules for action automation, according to some embodiments. In block 1510, process 1500 determines, using an electronic device (e.g., electronic device 120, FIG. 2, system 2200, FIG. 22), an action based on domain (e.g., smartphone, smart TV, smart appliances, digital health monitoring, TV viewership, etc.) information. In block 1520, process 1500 retrieves multiple activity patterns indicating the situations in which the user performs the action with high likelihood (e.g., a repeated action or actions associated with context and/or conditions, etc.). In block 1530, process 1500 provides that for each activity pattern, a candidate action rule is determined. In one embodiment, only one candidate action rule is determined per each activity pattern. In some embodiments, each candidate action rule specifies one or more pre-conditions (e.g., based on time, day of week, weather, location/place, etc.) when the action occurs. In block 1540, process 1500 determines one or more preferred candidate conditional action rules (e.g., summarizes all or most of the candidate rules into a subset of candidate rules) from multiple candidate conditional action rules for automation of the action. In block 1550, process 1500 provides a suggestion (e.g., on a display of an electronic device 120, FIG. 2, through a speaker, headset, etc.) on the electronic device for automating the action and provides, on the electronic device, a reminder (e.g., on a display of an electronic device 120, through a speaker, headset, etc.) to perform an automation for the action. In some embodiments, the one or more preferred candidate rules are applied for performing automation of the action.

In some embodiments, in process 1500 the one or more preferred candidate conditional action rules include pre-conditions that lead to occurrence of the action with a probability exceeding a first likelihood (e.g., probability of occurrence, etc.) threshold. The one or more pre-conditions may be associated with a first time duration that occurs more often than a second threshold (e.g., a selected or pre-determined time duration, such as an hour, two hours, etc.) and less than often than a third threshold (e.g., another selected or pre-determined time duration, such as three hours, four hours, etc.) over a second time duration.

In some embodiments, in process 1500 the one or more preferred candidate conditional action rules cover a number of occurrences of the action over the second time duration that is greater than a fourth threshold (e.g., a selected or pre-determined number of times the action occurs, etc.). In some embodiments, the total number of the one or more preferred candidate conditional action rules is less than a fifth threshold (e.g., 6, 5, etc.). In some embodiments, the one or more preferred candidate conditional action rules is a subset of candidate conditional action rules that summarize all candidate conditional action rules.

Figure 16:
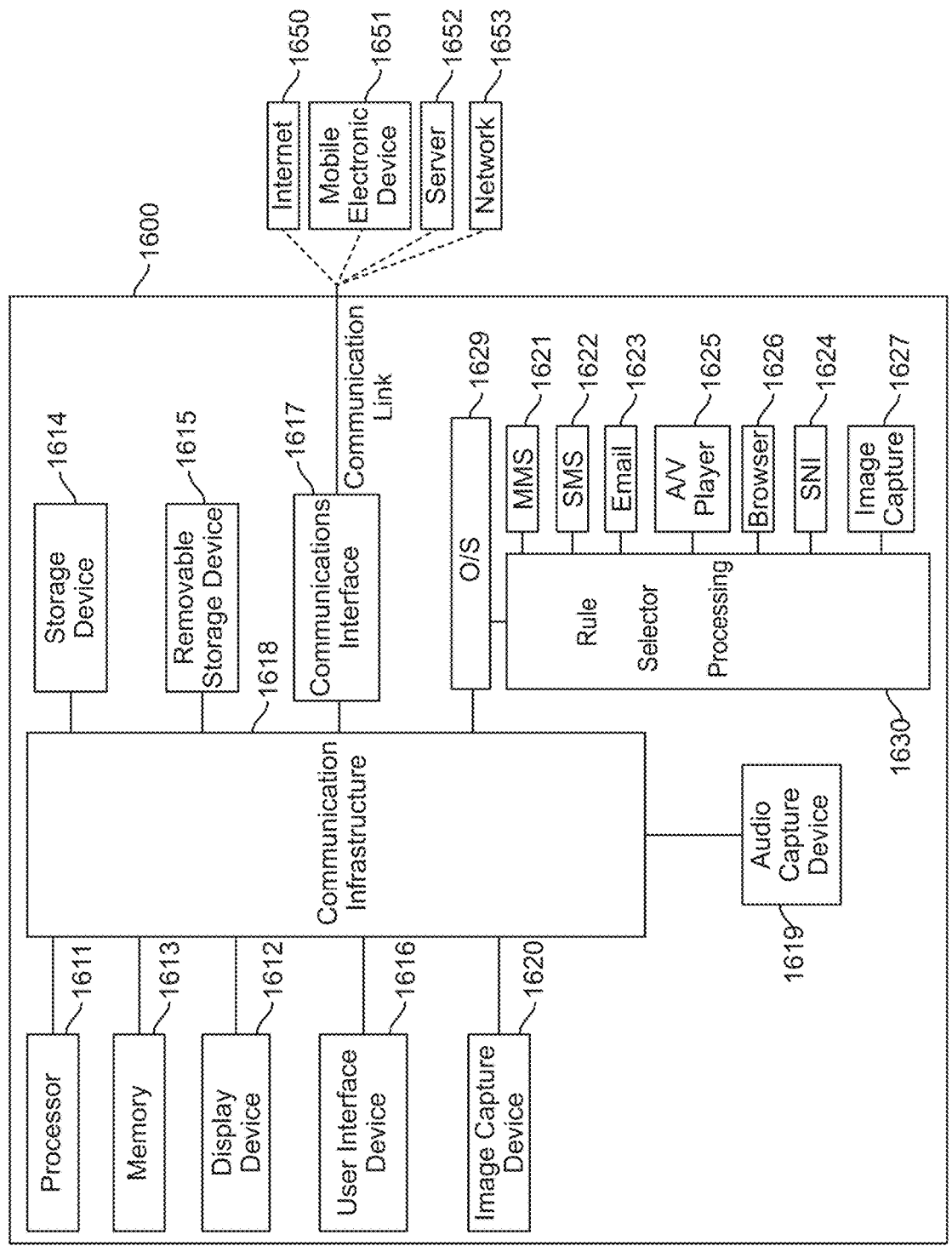
FIG. 16 is a high-level block diagram showing an information processing system comprising a computing system implementing one or more embodiments.

FIG. 16 is a high-level block diagram showing an information processing system comprising a computing system implementing one or more embodiments. The system 1600 includes one or more processors 1611 (e.g., ASIC, CPU, etc.), and may further include an electronic display device 1612 (for displaying graphics, text, and other data), a main memory 1613 (e.g., random access memory (RAM), cache devices, etc.), storage device 1614 (e.g., hard disk drive), removable storage device 1615 (e.g., removable storage drive, removable memory, a magnetic tape drive, optical disk drive, computer-readable medium having stored therein computer software and/or data), user interface device 1616 (e.g., keyboard, touch screen, keypad, pointing device), and a communication interface 1617 (e.g., modem, wireless transceiver (such as Wi-Fi, Cellular), a network interface (such as an Ethernet card), a communications port, or a PCMCIA slot and card).

The communication interface 1617 allows software and data to be transferred between the computer system and external devices through the Internet 1650, mobile electronic device 1651, a server 1652, a network 1653, etc. The system 1600 further includes a communications infrastructure 1618 (e.g., a communications bus, cross bar, or network) to which the aforementioned devices 1611 through 1617 are connected.

The information transferred via communications interface 1617 may be in the form of signals such as electronic, electromagnetic, optical, or other signals capable of being received by communications interface 1617, via a communication link that carries signals and may be implemented using wire or cable, fiber optics, a phone line, a cellular phone link, a radio frequency (RF) link, and/or other communication channels.

In one implementation of one or more embodiments in a mobile wireless device (e.g., a mobile phone, tablet, wearable device, etc.), the system 1600 further includes an image capture device 1620, such as a camera 128 (FIG. 2), and an audio capture device 1619, such as a microphone 122 (FIG. 2). The system 1600 may further include application processing or processors as MMS 1621, SMS 1622, email 1623, social network interface (SNI) 1624, audio/video (AV) player 1625, web browser 1626, image capture 1627, etc.

In one embodiment, the system 1600 includes rule selector processing 1630 that may implement processing similar as described regarding rule selector processing app 129 (FIG. 2), and for processing described above in relation to FIGS. 5-10. In one embodiment, the rule selector processing 1630 along with an operating system 1629 may be implemented as executable code residing in memory of the system 1600. In another embodiment, the rule selector processing 1630 may be provided in hardware, firmware, etc.

In one embodiment, the main memory 1613, storage device 1614 and removable storage device 1615, each by themselves or in any combination, may store instructions for the embodiments described above that may be executed by the one or more processors 1611.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for action automation, comprising:
   receiving, by an electronic device, an action that includes a unique descriptor and a sequence of instantaneous timestamps;
   receiving, by the electronic device, a plurality of activity patterns from a memory device, the plurality of activity patterns associated with the action, wherein the plurality of activity patterns is obtained using rule confidence that is measured using temporal intervals of one or more context pre-conditions that avoids unbalanced durations of context intervals and user actions;
   for each activity pattern, receiving, by the electronic device, a candidate action rule, in a textual and semantic format, from a plurality of action rules based on contexts and actions stored by the electronic device, wherein the candidate action rule specifies, in the textual and the semantic format, the one or more of the context pre-conditions when the action occurs, and the contexts are obtained using raw sensor data from one or more sensor devices, semantic places and commuting activities;

displaying, by the electronic device, optimized textual automation suggestions, on a display device, as one or more preferred candidate action rules from a plurality of candidate action rules by a rule selector processing application that receives a combination of a plurality of parameters and a plurality of thresholds from the electronic device that generates an automation of the action by separating context intervals and user actions processed by the electronic device using the one or more sensor devices, wherein optimization reduces a number original textual suggestions that results in the optimized textual automation suggestions having less textual suggestions than the original textual suggestions, the plurality of parameters comprises an inverse of prior occurrences for the particular context precondition, and a measure that indicates continuous time intervals upon context descriptors co-occurring in input context data; and automatically performing, by the electronic device, the action from the optimized textual suggestions without user action.

2. The method for action automation of claim 1, wherein the one or more preferred candidate action rules include the one or more of the context pre-conditions that lead to occurrence of the action with a likelihood exceeding a first likelihood threshold, and the rule selector processing application reduces the plurality of candidate action rules generated from sensed user behavior patterns for the one or more preferred candidate action rules.

3. The method for action automation of claim 1, wherein the one or more of the context pre-conditions are associated with a first time duration that occurs more often than a second threshold and are associated with a second time duration that occurs less often than a third threshold, and the semantic places are determined based on sensed latitude and longitude data and clustering of individual place visits into significant location clusters.

4. The method for action automation of claim 3, wherein the one or more preferred candidate action rules cover a number of occurrences of the action over the second time duration that is greater than a fourth threshold.

5. The method for action automation of claim 1, wherein total number of the one or more preferred candidate action rules is less than a fifth threshold.

6. The method for action automation of claim 1, wherein the one or more preferred candidate action rules comprise a subset of candidate action rules that summarize all candidate action rules and comprise diverse conditional action rules that capture all action instances covered by the plurality of candidate action rules, the rule selector processing application is applied to public context datasets from smart homes, television viewership, and digital health monitoring for automation in these domains, and the inverse of prior occurrences for the particular context precondition comprises a measure of how temporally precise the one or more context preconditions are in a frequent itemset.

7. The method for action automation of claim 2, wherein: the plurality of parameters further comprises a redundancy metric for maximizing action coverage, and a rule confidence metric that is defined as a likelihood the action is performed upon satisfying a particular context pre-condition.

8. The method for action automation of claim 1, further comprising:
providing, on the electronic device, a reminder to perform an automation for the action based on the optimized automation textual suggestions,
wherein the plurality of thresholds comprises adjustable thresholds that are predefined for each of the plurality of parameters.

9. An electronic device comprising:
memory storing instructions; and
at least one processor executing the instructions to:
receive an action that includes a unique descriptor and a sequence of instantaneous timestamps;
receive a plurality of activity patterns from the memory, the plurality of activity patterns associated with the action, wherein the plurality of activity patterns is obtained using rule confidence that is measured using temporal intervals of one or more context pre-conditions that avoids unbalanced durations of context intervals and user actions;
for each activity pattern, receive a candidate action rule, in a textual and semantic format, from a plurality of action rules based on contexts and actions stored in the memory, wherein the candidate action rule specifies, in the textual and the semantic format, the one or more of the context pre-conditions when the action occurs, and the contexts are obtained using raw sensor data from one or more sensor devices, semantic places and commuting activities;
display optimized automation textual suggestions, on a display device, as one or more preferred candidate action rules from a plurality of candidate action rules by a rule selector processing application that receives a combination of a plurality of parameters and a plurality of thresholds from the electronic device that generates an automation of the action by separating context intervals and user actions, wherein optimization reduces a number original textual suggestions that results in the optimized textual automation suggestions having less textual suggestions than the original textual suggestions, the plurality of parameters comprises an inverse of prior occurrence for the particular context precondition, and a measure that indicates continuous time intervals upon context descriptors co-occurring in input context data; and
automatically perform the action from the optimized automation textual suggestions without user action.

10. The electronic device of claim 9, wherein the one or more preferred candidate action rules include the one or more of the context pre-conditions that lead to occurrence of the action with a likelihood exceeding a first likelihood threshold, and the rule selector processing application reduces the plurality of candidate action rules generated from sensed user behavior patterns for the one or more preferred candidate action rules.

11. The electronic device of claim 9, wherein the one or more of the context pre-conditions are associated with a first time duration that occurs more often than a second threshold and are associated with a second time duration that occurs less often than a third threshold, and the semantic places are determined based on sensed latitude and longitude data and clustering of individual place visits into significant location clusters.

12. The electronic device of claim 11, wherein the one or more preferred candidate action rules cover a number of occurrences of the action over the second time duration that is greater than a fourth threshold.

13. The electronic device of claim 9, wherein:
total number of the one or more preferred candidate action rules is less than a fifth threshold;
the one or more preferred candidate action rules comprise a subset of candidate action rules that summarize all candidate action rules and comprise diverse conditional action rules that capture all action instances covered by the plurality of candidate action rules;
the rule selector processing application is applied to public context datasets from smart homes, television viewership, and digital health monitoring for automation in these domains; and
the inverse of prior occurrences for the particular context precondition comprises a measure of how temporally precise the one or more context preconditions are in a frequent itemset.

14. The electronic device of claim 10, wherein:
the at least one processor further executing the instructions to:
provide a reminder to perform an automation for the action based on the one or more preferred candidate action rules;
the plurality of parameters further comprises a redundancy for maximizing action coverage, a rule confidence that is defined as a likelihood the action is performed upon satisfying a particular context precondition; and
the plurality of thresholds comprises adjustable thresholds that are predefined for each of the plurality of parameters.

15. A non-transitory processor-readable medium that includes a program that when executed by a processor performing a method comprising:
receiving, by an electronic device, an action that includes a unique descriptor and a sequence of instantaneous timestamps;
receiving, by the electronic device, a plurality of activity patterns from a memory device, the plurality of activity patterns associated with the action, wherein the plurality of activity patterns is obtained using rule confidence that is measured using temporal intervals of one or more context pre-conditions that avoids unbalanced durations of context intervals and user actions;
for each activity pattern, receiving, by the electronic device, a candidate action rule, in a textual and semantic format, from a plurality of action rules based on contexts and actions stored by the electronic device, wherein the candidate action rule specifies, in the textual and the semantic format, the one or more of the context pre-conditions when the action occurs, and the contexts are obtained using raw sensor data from one or more sensor devices, semantic places and commuting activities;
displaying, by the electronic device, optimized automation textual suggestions, on a display device, as one or more preferred candidate action rules from a plurality of candidate action rules by a rule selector processing application that receives a combination of a plurality of parameters and a plurality of thresholds from the electronic device that generates an automation of the action by separating context intervals and user actions, wherein optimization reduces a number original textual suggestions that results in the optimized textual automation suggestions having less textual suggestions than the original textual suggestions, the plurality of parameters comprises an inverse of prior occurrences for the particular context precondition, and a measure that indicates continuous time intervals upon context descriptors co-occurring in input context data; and
automatically performing, by the electronic device, the action from the optimized automation textual suggestions without user action.

16. The non-transitory processor-readable medium of claim 15, wherein the one or more preferred candidate action rules include the one or more of the context pre-conditions that lead to occurrence of the action with a likelihood exceeding a first likelihood threshold, and the rule selector processing application reduces the plurality of candidate action rules generated from sensed user behavior patterns for the one or more preferred candidate action rules.

17. The non-transitory processor-readable medium of claim 15, wherein the one or more of the context pre-conditions are associated with a first time duration that occurs more often than a second threshold and are associated with a second time duration that occurs less often than a third threshold, and the semantic places are determined based on sensed latitude and longitude data and clustering of individual place visits into significant location clusters.

18. The non-transitory processor-readable medium of claim 17, wherein the one or more preferred candidate action rules cover a number of occurrences of the action over the second time duration that is greater than a fourth threshold.

19. The non-transitory processor-readable medium of claim 15, wherein:
total number of the one or more preferred candidate action rules is less than a fifth threshold;
the one or more preferred candidate action rules comprise a subset of candidate action rules that summarize all candidate action rules and comprise diverse conditional action rules that capture all action instances covered by the plurality of candidate action rules;
the rule selector processing application is applied to public context datasets from smart homes, television viewership, and digital health monitoring for automation in these domains; and
the inverse of prior occurrences for the particular context precondition comprises a measure of how temporally precise the one or more context preconditions are in a frequent itemset.

20. The non-transitory processor-readable medium of claim 16, wherein:
the method further comprises:
providing, on the electronic device, a reminder to perform an automation for the action based on the one or more preferred candidate action rules;
the plurality of parameters further comprises a redundancy for maximizing action coverage, and a rule confidence that is defined as a likelihood the action is performed upon satisfying a particular context precondition; and
the plurality of thresholds comprises adjustable thresholds that are predefined for each of the plurality of parameters.

* * * * *